SLOW-SCAN COMPOSITE SIGNAL-PRODUCING APPARATUS
WITH MEANS FOR PRODUCING SYNC PULSES
BY OFFSETTING BLACK LEVEL

Filed Dec. 15, 1961 2 Sheets-Sheet 1

INVENTOR.
THEODORE I. MILLEN
BY
Fordyce A. Bothwell
ATTORNEY

SLOW-SCAN COMPOSITE SIGNAL-PRODUCING APPARATUS WITH MEANS FOR PRODUCING SYNC PULSES BY OFFSETTING BLACK LEVEL

Filed Dec. 15, 1961 2 Sheets-Sheet 2

INVENTOR.
THEODORE I. MILLEN
BY
Fordyce A. Bothwell
ATTORNEY

United States Patent Office 3,167,613

Patented Jan. 26, 1965

3,167,613
SLOW-SCAN COMPOSITE SIGNAL-PRODUCING APPARATUS WITH MEANS FOR PRODUCING SYNC PULSES BY OFFSETTING BLACK LEVEL

Theodore I. Millen, Don Mills, Ontario, Canada, assignor to Philco Corporation, Philadelphia, Pa., a corporation of Delaware Filed Dec. 15, 1961, Ser. No. 159,711
9 Claims. (Cl. 178—7.1)

This invention relates to slow-scan picture signal-producing apparatus which, while not suitable for use in transmission of pictures of moving objects or scenes, is suitable for transmission of pictures of stationary objects or scenes such as photographs, maps, diagrams, etc. With slow scanning it is possible to transmit still pictures with sufficiently high resolution over a narrow band channel such as a telephone line ordinarily used for voice transmission.

In a slow-scan system, as in the normal fast-scan system commonly employed in television, the video or picture signal is produced by scanning the televised object or scene in successive lines and fields, the line scanning rate being substantially higher than the field scanning rate. However the rates are much lower in the slow-scan system. Whereas in the normal fast-scan system the scanning rates are such that there are thirty frames per second, in the slow-scan system the scanning rates are such that there is only one frame in about two seconds.

While it is possible to employ electron beam scanning in a slow-scan system, this leads to complications which make it undesirable if not impractical.

One object of the present invention is to provide a slow-scan picture signal-producing apparatus in which the scanning action is effected mechanically rather than electronically.

Another object of the invention is to provide such an apparatus which is simple and therefore inexpensive to manufacture.

Still another object of the invention is to provide such an apparatus which serves not only to produce a picture signal but also to provide the necessary synchronizing information in the generated signal.

Other objects and features of the invention will become apparent as the description proceeds.

In accordance with this invention, an image to be scanned is projected by a lens which is moved rectilinearly at a relatively slow speed to move the image accordingly. At the end of its predetermined travel the lens is moved rapidly back to its starting position, and the operation is repeated. This repeated slow movement of the image constitutes the field scanning action. While the image is being slowly moved, it is scanned in successive lines by a rotating scanner which preferably is in the form of a hollow opaque cylinder or drum having small scanning apertures or windows. The scanner is rotated at relatively higher speed and the arrangement is such that its small apertures or windows scan successive lines of the slowly moving image. The light from the image which passes through the scanning apertures or windows activates a light-sensitive device, such as a photomultiplier tube, to produce an electrical signal representative of the image.

Further in accordance with this invention, synchronizing components are provided in the generated signal in the following manner, it being understood that "synchronizing components" refers to line and field synchronizing components corresponding generally to the synchronizing components of a standard monochrome television signal.

To produce the line synchronizing component, provision is made for interrupting the passage of light between successive line scans. For this purpose in the preferred embodiment employing a scanning drum, an optical stop or shield arrangement is provided in such relation to the scanning apertures as to effect the desired light interruption. In addition the image area or field is provided with a constant low level of illumination which, during each line scan, establishes a reference level or picture black level analogous to the so-called "black level" in the standard television signal. Consequently the interruption of light between successive line scans produces a signal component analogous to the "blacker than black" horizontal synchronizing pulses in the standard television signal.

To produce the field synchronizing component, during the interval between two consecutive field scans a switch is closed momentarily to energize an oscillator so as to produce a high frequency burst which is added to the signal produced by the photomultiplier tube.

The invention may be fully understood from the following detailed description with reference to the accompanying drawings wherein FIG. 1 is a perspective view of one form of apparatus according to the invention;

Figures 1, 3:
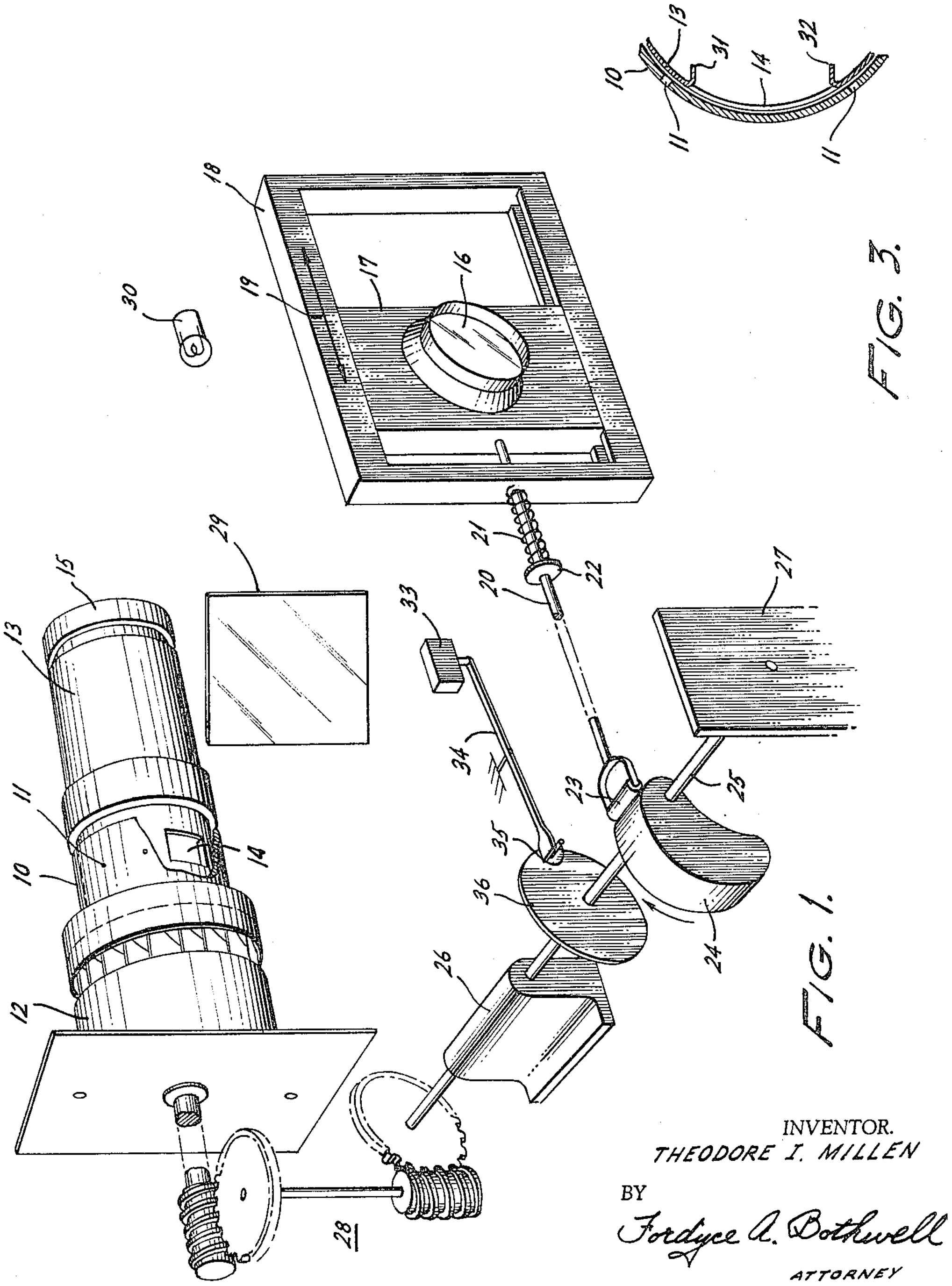
FIG. 3 is a detail fragmentary sectional view taken in the plane 3—3 of FIG. 2.
Figure 2:
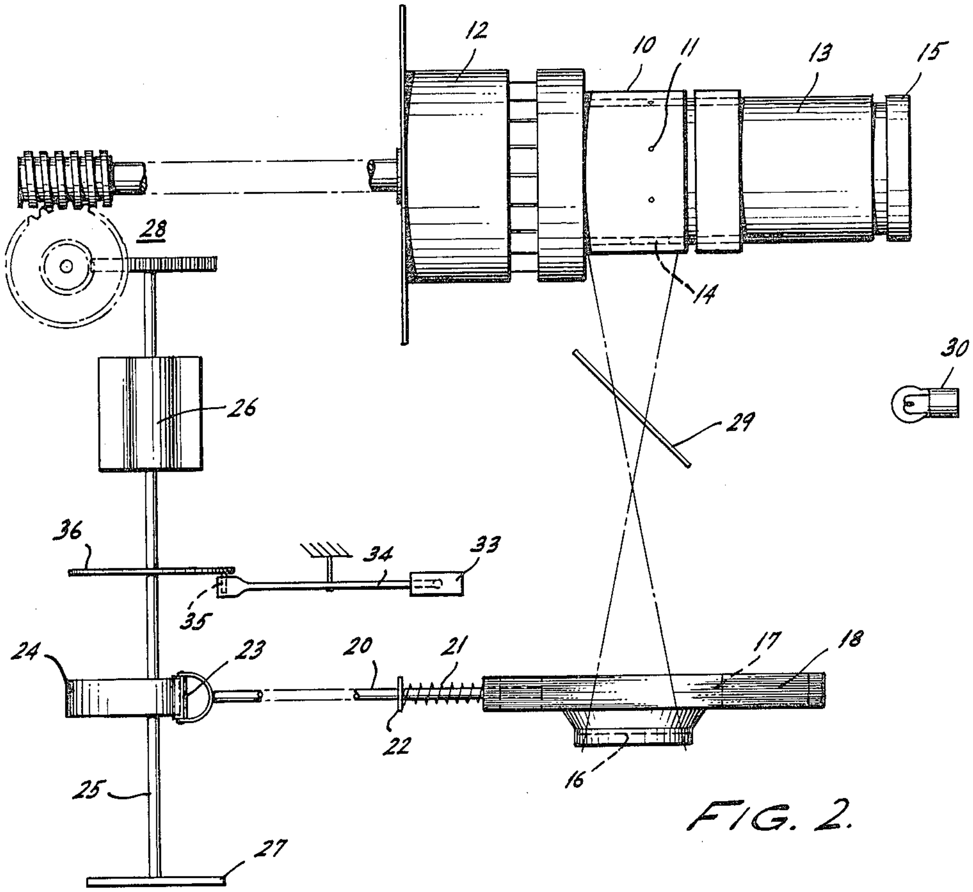
FIG. 2 is a plan view of the same.

Referring particularly to FIGS. 1 and 2 of the drawings, the scanning drum 10, having small scanning windows or apertures 11, is rotated by a motor 12 through reduction gearing (not visible). The scanning windows or apertures 11 are equally spaced about the periphery of drum 10 in a common plane transverse to the axis of rotation of the drum. Extending within drum 10 is a stationary cylindrical member 13 which has a relatively large window or opening 14. The windowed portion of this member serves as optical stop means to effect the aforementioned light interruption as hereinafter more fully described. Extending within member 13 is a photomultiplier tube 15 whose photocathode receives light passing through the scanning windows or apertures 11 and the window or opening 14.

An image-projecting lens 16 is arranged to project an image of a viewed object onto the side of the scanning drum, and as the latter rotates the lens is slowly moved in one direction so as to slowly move the image and cause it to be scanned in successive lines by the scanning windows or apertures 11. In the illustrated embodiment the lens 16 is mounted on a support 17 which is movably mounted in a stationary frame 18 for rectilinear reciprocating movement as indicated by the double head arrow 19. A movable rod 20 has one end secured to support 17 and is urged in the left-hand direction by a coil spring 21 interposed between a flange 22 on said rod and a side of frame 18. At the other end of rod 20 there is a roller 23 which engages a cam 24. The cam is driven clockwise as viewed in FIG. 1. As the cam rotates it moves the lens slowly from left to right against the force of spring 21 through the operating range and then permits the spring to return the lens abruptly to the starting position. The cam shaft 25 is rotatably mounted in supports 26 and 27 and is driven by motor 12 through reduction gearing 28.

As the image is scanned in successive lines and fields due to the rotation of the scanning drum 10 and the rectilinear movement of lens 16, light from the image passes through the scanning windows or apertures 11 and activates the photomultiplier which produces a signal representative of the image.

In order to provide the aforementioned constant low level of illumination of the image area or field, a transparent slightly-reflective member 29 is interposed between the lens 16 and the scanning drum 10, and a D.C. lamp 30 is arranged so that some of the light therefrom is reflected by member 29 to and over the image area. Member 29 may be composed of ordinary window glass which, while transparent, is slightly reflective.

Returning now to the stationary member 13 and referring to FIG. 3, it will be noted that the window or opening 14 is of such dimension peripherally of said member that the turned edges 31 and 32 are spaced apart somewhat less (e.g. about 10% less) than the spacing between the scanning apertures 11. Consequently for a very short time between successive line scans of the image the light passage is interrupted. The result is that the generated signal goes to zero which, however, represents a "blacker than black" line synchronizing component because black is represented by the constant low level of illumination over the image area.

Figure 4:
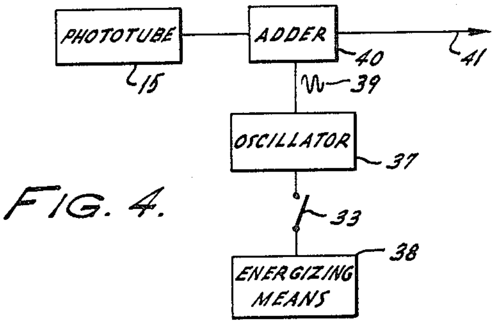
FIG. 4 is a block diagram of electrical components of the apparatus according to the invention.

Referring to FIGS. 1 and 2, in order to produce the field synchronizing component in the generated signal as hereinbefore mentioned, a normally-open microswitch 33 is momentarily closed between successive field scans by a pivoted lever 34 which is actuated by a pin 35 on disc 36. As shown in FIG. 4, the closure of the microswitch momentarily energizes an oscillator 37 from energizing means 38 to produce a high-frequency burst 39 which is added in adder 40 to the signal produced by the photomultiplier 15.

Figure 5:
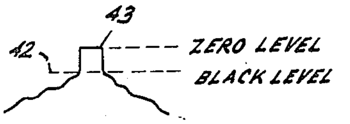
FIGS. 5 and 6 illustrate portions of the generated signal.
Figure 6:

The form of the composite signal at output 41 can be visualized more clearly from the illustrations of FIGS. 5 and 6. FIG. 5 shows the signal during portions of two consecutive line scans and during the interval therebetween when the light passage is interrupted. FIG. 6 shows the signal at the end of one field scan and the beginning of the next field scan and during the interval between the field scans. The constant low level of illumination establishes the picture black level represented at 42 in both figures. In the course of a field scan, during the interval between line scans when the light passage is interrupted, the signal goes to the zero level represented at 43 in FIG. 5, so that a "blacker than black" line synchronizing pulse is produced, as in the standard television signal. During the interval between field scans, the burst 39 from oscillator 37 is added as shown in FIG. 6 to provide the field synchronizing component. The burst is readily extracted at the receiver end by a selective filter.

By way of example, in one physical embodiment of the invention, the scanning drum 10 has an outside diameter of 2.5 inches and there are twenty equally-spaced scanning apertures 11 each having a diameter of .0025 inch. The drum 10 is rotated at a speed of 360 r.p.m., and the cam shaft 25 is rotated at a speed of 27.6 r.p.m., both being driven from an 1800 r.p.m. synchronous motor. The frame rate is one frame in 2⅙ seconds. There are 260 lines per frame, each line being scanned in $\frac{1}{120}$ second.

It will be apparent that the operating characteristics depend on the speeds employed and the number of apertures in the scanning drum, and these can be selected to to give the operating characteristics desired in any instance. Furthermore it is possible to provide for interlaced scanning by suitable design of the apparatus.

In the illustrated apparatus the lens projects the image onto the side of the scanning drum and since the latter is curved there is some slight distortion. However this is so small that it is not objectionable.

It may be noted also that the provision of the constant low level of illumination over the image area tends slightly to degrade the optical contrast of the image, but complete recovery of contrast values can be obtained at the receiver by suitable biasing of the display device.

While the invention has been described with reference to the particular embodiment illustrated, it will be understood that it is not limited to such embodiment but contemplates such modifications and further embodiments as may be devised by those skilled in the art.

I claim:

1. Slow-scan picture signal-producing apparatus, comprising a rotatable scanning drum having spaced peripheral scanning windows or apertures in a common plane transverse to the axis of rotation of said drum, means for rotating said drum, means for repeatedly slowly moving an image to be scanned in front of said apertures so as to effect scanning of the image by said windows in successive lines and fields, means for translating the light passing through said windows from said image into an electrical signal, means for providing over the image area a constant low level of illumination, thereby to establish a "black" level in said signal, and means for interrupting the light passage to said translating means between successive line scans of the image, thereby to provide in said signal line synchronizing pulses on the "blacker than black" side of said level.

2. Slow-scan picture signal-producing apparatus, comprising a rotatable hollow opaque scanner having small windows aranged to successively confront an adjacent image to be scanned as said scanner rotates, means for rotating said scanner at a predetermined speed, means for creating the image to be scanned, means for effecting such movement of said image as to cause repeated line and field scanning of the image, means within said scanner for translating the scanning of said image into an electrical signal, means for producing a line synchronizing component in said signal between successive line scans, and means for producing a field synchronizing component in said signal between successive field scans.

3. Slow-scan picture signal-producing apparatus, comprising a rotatable hollow opaque scanner having small windows arranged to successively confront an adjacent image to be scanned as said scanner rotates, means for rotating said scanner at a predetermined speed, means for creating the image to be scanned, means for effecting such movement of said image as to cause repeated line and field scanning of the image, means within said scanner responsive to light passing through said windows for translating the scanning of said image into an electrical signal, means for superimposing on said image a constant low level of illumination so that said signal varies in relation to a reference level established by said illumination, means for interrupting the light passage to said translating means between successive line scans of the image, thereby to produce a line synchronizing component in said signal between successive line scans, and means for producing a field synchronizing component in said signal between successive field scans.

4. Slow-scan picture signal-producing apparatus, comprising a rotatable hollow opaque scanner having small windows arranged to successively confront an adjacent image to be scanned as said scanner rotates, means for rotating said scanner at a predetermined speed, means for creating the image in a position to be confronted successively by said windows, means for moving said image at relatively low speed rectilinearly in a direction to bring successive portions of said image into confronting relation with said windows, thereby to effect scanning of said image by said windows in successive lines, means within said scanner responsive to light passing through said windows for translating the scanning of said image into an electrical signal, means for superimposing on said image a constant low level of illumination so that said signal varies in relation to a reference level established by said illumination, and means for interrupting the light passage to said translating means between successive line scans of the image, thereby to produce a synchronizing component in said signal between successive line scans.

5. Slow-scan picture signal-producing apparatus, comprising a rotatable scanning drum having spaced peripheral scanning windows or apertures in a common plane transverse to the axis of rotation of said drum, means for rotating said drum, means for repeatedly slowly moving an image to be scanned in front of said apertures so as to effect scanning of the image by said windows in successive lines and fields, means for translating the light passing through said windows from said image into an electrical signal, means for providing over the image area a constant low level of illumination, thereby to establish a "black" level in said signal, and stationary optical stop means arranged within said drum to interrupt the light passage to said translating means between successive line scans of the image, thereby to provide in said signal line synchronizing pulses on the "blacker than black" side of said level.

6. Slow-scan picture signal-producing apparatus, comprising a rotatable scanning drum having spaced peripheral scanning windows or apertures in a common plane transverse to the axis of rotation of said drum, means for rotating said drum, means for repeatedly slowly moving an image to be scanned in front of said apertures so as to effect scanning of the image by said windows in successive lines and fields, means for translating the light passing through said windows from said image into an electrical signal, means for providing over the image area a constant low level of illumination, thereby to establish a "black" level in said signal, and a stationary cylindrical member within said scanning drum having a window whose peripheral dimension is slightly less than the spacing between the scanning windows of the scanning drum, said stationary member serving to interrupt the light passage to said translating means between successive line scans of the image, thereby to provide in said signal line synchronizing pulses on the "blacker than black" side of said level.

7. Slow-scan picture signal-producing apparatus, comprising a rotatable scanning drum having spaced peripheral scanning windows or apertures in a common plane transverse to the axis of rotation of said drum, means for rotating said drum, means for repeatedly slowly moving an image to be scanned in front of said apertures so as to effect scanning of the image by said windows in successive lines and fields, means for translating the light passing through said windows from said image into an electrical signal, means for providing over the image area a constant low level of illumination, thereby to establish a "black" level in said signal, stationary optical stop means arranged to interrupt the light passage to said translating means between successive line scans of the image, thereby to provide in said signal line synchronizing pulses on the "blacker than black" side of said level, an oscillator having its output connected to the output of said translating means, and means for effecting operation of said oscillator only momentarily between successive field scans, thereby to add field synchronizing bursts to said signal.

8. Slow-scan picture signal-producing apparatus, comprising a rotatable scanning drum having spaced peripheral scanning windows or apertures in a common plane transverse to the axis of rotation of said drum, a motor for driving said drum, a lens, means supporting said lens so as to move an image projected thereby in front of said apertures for line-by-line scanning of the image by said windows, means including a cam driven by said motor for moving said lens slowly in one direction and rapidly in the opposite direction so as to effect scanning of the image in successive lines and fields, means for translating the light passing through said windows from said image into an electrical signal, means for providing over the image area a constant low level of illumination, thereby to establish a "black" level in said signal, stationary optical means arranged to interrupt the light passage to said translating means between successive line scans of the image, thereby to provide in said signal line synchronizing pulses on the "blacker than black" side of said level, an oscillator having its output connected to the output of said translating means, and means for effecting operation of said oscillator only momentarily between successive field scans, thereby to add field synchronizing bursts to said signal.

9. Slow-scan picture signal-producing apparatus, comprising means for creating an image to be scanned, means for translating light variations into an electrical signal, means for supplying to said translating means light representing elemental areas of said image in successive line and field scans of the image, thereby to produce an electrical signal representative of said image, means for providing over the image area a constant low level of illumination, thereby to establish a "black" level in said signal, means for interrupting the light supply to said translating means between successive line scans of the image, thereby to provide in said signal line synchronizing pulses on the "blacker-than-black" side of said level, an oscillator having its output connected to the output of said translating means, and means for effecting operation of said oscillator only momentarily between successive field scans, thereby to add field synchronizing bursts to said signal.

References Cited in the file of this patent

UNITED STATES PATENTS

| | | |
|---|---|---|
| 2,287,413 | Bruce | June 23, 1942 |
| 2,962,549 | Fricks | Nov. 29, 1960 |